United States Patent
Maeda et al.

(10) Patent No.: US 10,714,052 B2
(45) Date of Patent: Jul. 14, 2020

(54) DISPLAY DEVICE

(71) Applicant: Yazaki Corporation, Tokyo (JP)

(72) Inventors: Tomohiro Maeda, Shizuoka (JP);
Masakatsu Suyama, Shizuoka (JP);
Takayuki Ono, Shimada (JP); Kaori Kobayashi, Shimada (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/728,720

(22) Filed: Oct. 10, 2017

(65) Prior Publication Data
US 2018/0108326 A1    Apr. 19, 2018

(30) Foreign Application Priority Data

Oct. 14, 2016   (JP) ................................ 2016-202335

(51) Int. Cl.
*G09G 5/02*        (2006.01)
*G06T 11/00*       (2006.01)

(52) U.S. Cl.
CPC ............ *G09G 5/026* (2013.01); *G06T 11/001* (2013.01); *G09G 5/02* (2013.01);
(Continued)

(58) Field of Classification Search
CPC ......... G09G 3/3648; G09G 2320/0261; G09G 2320/0285; G09G 3/3614;
(Continued)

(56) References Cited

U.S. PATENT DOCUMENTS

| | | | |
|---|---|---|---|
| 2004/0233157 A1 | 11/2004 | Sekiya et al. | |
| 2006/0153288 A1* | 7/2006 | Prochnow | H04N 19/51 375/240.01 |

(Continued)

FOREIGN PATENT DOCUMENTS

| | | | |
|---|---|---|---|
| JP | 2003345285 A | 12/2003 | |
| JP | 2004045702 A | 2/2004 | |

(Continued)

OTHER PUBLICATIONS

Communication dated Sep. 4, 2018, from Japanese Patent Office in counterpart application No. 2016-202335.

(Continued)

*Primary Examiner* — Sultana M Zalalee
(74) *Attorney, Agent, or Firm* — Sughrue Mion, PLLC

(57) ABSTRACT

A display device includes a display unit and a controller. The display unit displays an image thereon. The controller is capable of, when the image is displayed as being moved, controlling the display unit to execute moving-manner correction processing in which pixels forming the image to be moved are displayed in display colors determined by corrected R, G, and B values obtained by adding RGB correction values to color component values provided as R, G, and B values that indicate red, green, and blue color components of respective display colors of corresponding pixels forming the image while the image has been stopped. Each of the RGB correction values has been previously determined in common for the color component values of a corresponding display color.

4 Claims, 5 Drawing Sheets

(52) U.S. Cl.
CPC ............... *G09G 2300/0452* (2013.01); *G09G 2320/0242* (2013.01); *G09G 2320/0261* (2013.01); *G09G 2380/10* (2013.01)

(58) Field of Classification Search
CPC ..... G09G 2300/0417; G09G 2310/027; G09G 2310/04; G09G 2310/06; G09G 2320/02; G09G 2320/0242; G09G 2320/0252; G09G 2320/103; G09G 2320/106; G09G 2340/16; G09G 2360/12; G09G 3/3225; G09G 3/3607; G09G 3/3685; G09G 5/006; G09G 2310/065

See application file for complete search history.

(56) References Cited

U.S. PATENT DOCUMENTS

| | | | |
|---|---|---|---|
| 2007/0063956 A1* | 3/2007 | Jong | G09G 3/3648 345/98 |
| 2007/0133871 A1* | 6/2007 | Yoshiura | H04N 9/646 382/167 |
| 2007/0146262 A1 | 6/2007 | Ogasawara et al. | |
| 2008/0284702 A1* | 11/2008 | Shidara | G09G 3/20 345/90 |
| 2009/0027401 A1* | 1/2009 | Loveridge | G09G 5/006 345/501 |
| 2009/0058775 A1 | 3/2009 | Hotta et al. | |
| 2009/0225183 A1* | 9/2009 | Tamura | G06T 5/50 348/222.1 |
| 2009/0226093 A1* | 9/2009 | Guo | G06K 9/00234 382/190 |
| 2009/0284597 A1* | 11/2009 | Nakamori | G06K 9/00798 348/148 |
| 2010/0091183 A1* | 4/2010 | Hatasawa | H04N 7/012 348/448 |
| 2010/0315447 A1* | 12/2010 | Ozone | G09G 3/2007 345/690 |
| 2011/0128309 A1* | 6/2011 | Miyazaki | G09G 3/3607 345/690 |
| 2011/0255104 A1* | 10/2011 | Matsuhira | H04N 1/6072 358/1.9 |
| 2012/0008166 A1* | 1/2012 | Noto | G06F 3/1204 358/1.15 |
| 2013/0169663 A1* | 7/2013 | Seong | G09G 5/00 345/589 |
| 2013/0235061 A1* | 9/2013 | Sadasue | G09G 5/02 345/589 |
| 2014/0055473 A1* | 2/2014 | Kikuchi | G09G 5/022 345/531 |
| 2015/0235600 A1 | 8/2015 | Inada et al. | |
| 2016/0379584 A1* | 12/2016 | Onishi | G09G 3/3648 345/691 |

FOREIGN PATENT DOCUMENTS

| | | |
|---|---|---|
| JP | 2007-178179 A | 7/2007 |
| JP | 2009053510 A | 3/2009 |
| WO | 0110131 A1 | 2/2001 |
| WO | 2014030411 A1 | 2/2014 |

OTHER PUBLICATIONS

Communication dated Mar. 26, 2019 from Japanese Patent Office in counterpart JP Application No. 2016-202335.

* cited by examiner

DISPLAY DEVICE

CROSS-REFERENCE TO RELATED APPLICATION(S)

The present application claims priority to and incorporates by reference the entire contents of Japanese Patent Application No. 2016-202335 filed in Japan on Oct. 14, 2016.

BACKGROUND OF THE INVENTION

1. Field of the Invention

The present invention relates to a display device.

2. Description of the Related Art

Conventional display devices applied to vehicles include, for example, a display device disclosed in Japanese Patent Application Laid-open No. 2007-178179. The display device is a liquid crystal display meter configured to display a dial window and an indicator needle on a screen of a liquid crystal panel and, depending on a speed at which the indicator needle moves, reduces the color density with which the indicator needle is displayed.

The liquid crystal display meter disclosed in Japanese Patent Application Laid-open No. 2007-178179 occasionally displays, as being moved in a desired direction, an image that has been being displayed as being stopped, for example. A technique that enables the image to be displayed appropriately without any incongruity felt even in such a case is desirable.

SUMMARY OF THE INVENTION

The present invention has been made in consideration of the above situation, and is directed to providing a display device capable of appropriately displaying images.

In order to solve the above mentioned problem and achieve the object, a display device according to one aspect of the present invention includes a display unit configured to display an image; and a controller capable of, when the image is displayed as being moved, controlling the display unit to execute moving-manner correction processing by which pixels forming the image to be moved are displayed in display colors determined by corrected R, G, and B values obtained by adding RGB correction values to color component values provided as R, G, and B values that indicate red, green, and blue color components of respective display colors of corresponding pixels forming the image while the image has been stopped, the RGB correction values each having been previously determined in common for the color component values of a corresponding display color.

According to another aspect of the present invention, in the display device, it is preferable that the moving-manner correction processing is processing by which pixels forming the image to be moved are displayed in display colors determined by the corrected R, G, and B values, and a decrease in luminance of the image from when the image has been stopped that occurs while the image is displayed as being moved is therefore suppressed, and the RGB correction values are set to values that result in suppression of a decrease in luminance of the image that occurs, from when the image has been stopped, while the image is displayed as being moved.

According to still another aspect of the present invention, in the display device, it is preferable that the RGB correction values are set so as to be larger when corresponding to a display color of a pixel in a region of the image that is relatively short in the direction of moving the image and to be smaller when corresponding to a display color of a pixel in a region of the image that is relatively long in the direction of moving the image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail based on the drawings. This embodiment is not intended to limit the invention. Components included in the following embodiment may include a component that the skilled person can easily replace with a different component, and may include components substantially the same as each other.

Embodiment

Figure 1:
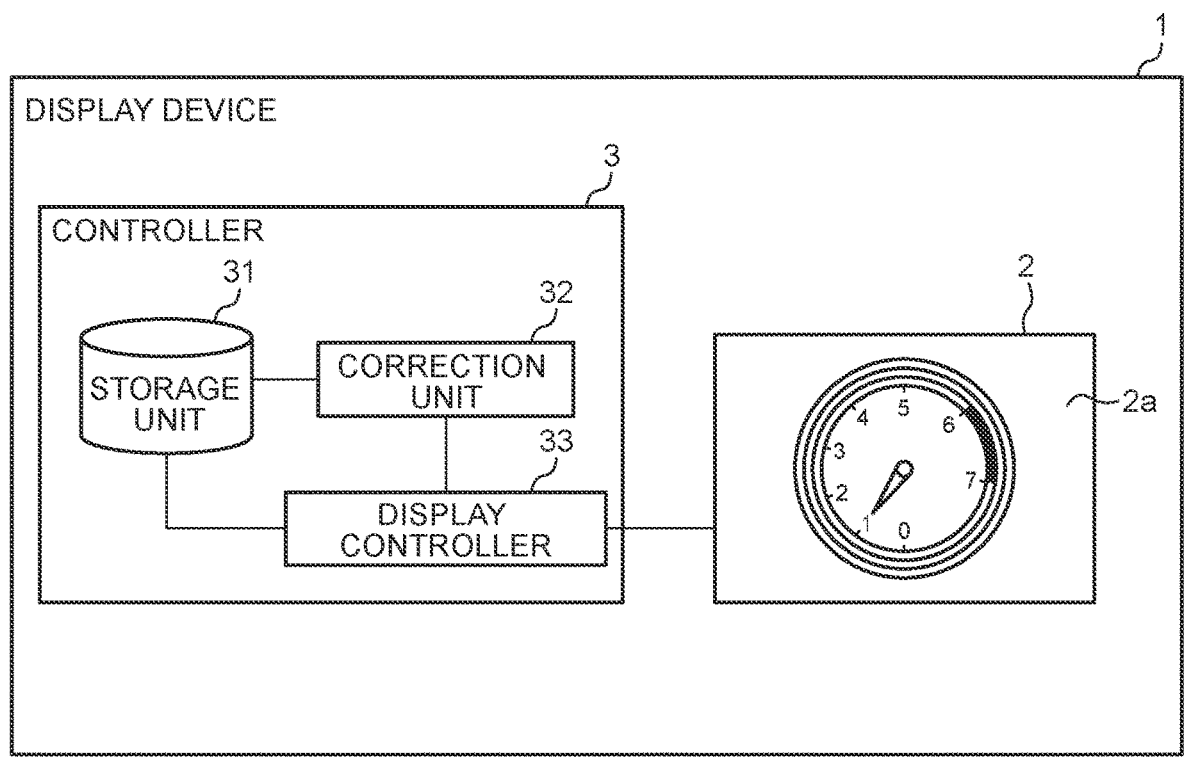
FIG. 1 is a block diagram illustrating a schematic configuration of a display device according to an embodiment.

A display device 1 according to the present embodiment in FIG. 1 is employed, for example, for a vehicle, and is included as a component in an in-vehicle meter employed for the vehicle. The display device 1 is mounted on, for example, an instrument panel installed in a dashboard of the vehicle, and displays thereon various kinds of vehicle information that serve for driving of the vehicle.

Specifically, the display device 1 includes a display unit 2 and a controller 3 as illustrated in FIG. 1.

The display unit 2 is configured to display images on an image display surface 2a composed of a plurality of pixels. The display unit 2 according to this embodiment is mounted on a vehicle as described above, and displays images about vehicle information on the vehicle. The images about vehicle information on the vehicle that are displayed on the display unit 2 may include images about vehicle information on the vehicle such as the speed of the vehicle, the accumulated traveled distance, the temperature of cooling water, the number of output revolutions of a power source for running the vehicle, the remaining amount of fuel, the amount of power stored in the battery, navigation information, map information, and information on intersections. The images about vehicle information on the vehicle that are displayed on the display unit 2 may further include images, such as various patterns, signs, and character strings, according to vehicle information indicated by, for example, various warning lamps (what are called telltales), a shift position indicator, and a direction indication sign. The images about vehicle information on the vehicle that are displayed on the display unit 2 may also include images of indicator needles that represent various different measured values about the vehicle, and gauge sections, such as scales, on which the respective indicator needles points to values.

While the display unit 2 can be constructed using, for example, a liquid crystal display (liquid crystal panel) that employs thin film transistors (TFTs), the display unit 2 is not limited to this example and can alternatively be constructed using a display such as a plasma display or an organic electroluminescence (EL) display. The image display surface 2a of the display unit 2 is composed of a plurality of regularly arrayed pixels. Each of the pixels is a minimum unit, or a minimum element, having color information (a hue and a gradation), and is composed of one red sub-pixel, one green sub-pixel, and one blue sub-pixel. A display color of each of the pixels forming an image displayed on the image display surface 2a can be expressed as R, G, and B (red, green, and blue) values that indicate red, green, and blue color components of the color. Red, green, and blue are three primary colors of light, and R, G, and B stand for red, green, and blue, respectively. Various colors can be expressed by different combinations of these three colors of R, G, and B. The R, G, and B values are expressed as digits between 0 and 255 that are the R value, which is a color component value indicating the red component, the G value, which is a color component value indicating the green component, and the B value, which is a color component value indicating the blue component, respectively. For example, the R, G, and B values that indicate black are the R, G, and B values of (0, 0, 0), and the R, G, and B values that indicate white are the R, G, and B values of (255, 255, 255). For example, red can be defined as (R, G, B)=(a digit between 1 and 255, 0, 0) or the like. Thus, colors perceived equally as red can be defined as different kinds of red, for example, as a kind of red defined as (R, G, B)=(10, 0, 0) and as another kind of red defined as (R, G, B)=(255, 0, 0) that is denser (darker) than the foregoing kind of red, by adjusting gradations of 0 to 255. On the display unit 2, outputs from the red sub-pixel, the green sub-pixel, and the blue sub-pixel of each of the pixels are adjusted based on R, G, and B values, so that the pixel is displayed in a display color determined by these R, G, and B values.

The controller 3 is configured to control the display unit 2 and thereby control display that the display unit 2 performs. Typically, the controller 3 controls images that the display unit 2 displays. The controller 3 may be constructed of, for example, an electronic controller (ECU) that centrally controls individual units of the vehicle and that doubles as the controller 3. Alternatively, the controller 3 may be constructed separately from the ECU and configured to exchange information in the form of detection signals, drive signals, control commands, and the like with the ECU. The controller 3 includes electronic circuitry the main part of which is a known microcomputer that includes a central processing unit (CPU), a read-only memory (ROM), random access memory (RAM), and an interface. Various pieces of equipment, such as sensors and detectors, that detect states of the vehicle are electrically coupled to the controller 3, so that electric signals according to detection results are input thereto. The controller 3 is electrically coupled to the display unit 2 and outputs drive signals to the display unit 2. The controller 3 executes a control program stored in, for example, the ROM or the RAM based on various input signals input from the various pieces of equipment, such as sensors and detectors, to output drive signals to the display unit 2, thus executing various kinds of processing for controlling images that the display unit 2 displays.

Figure 2:
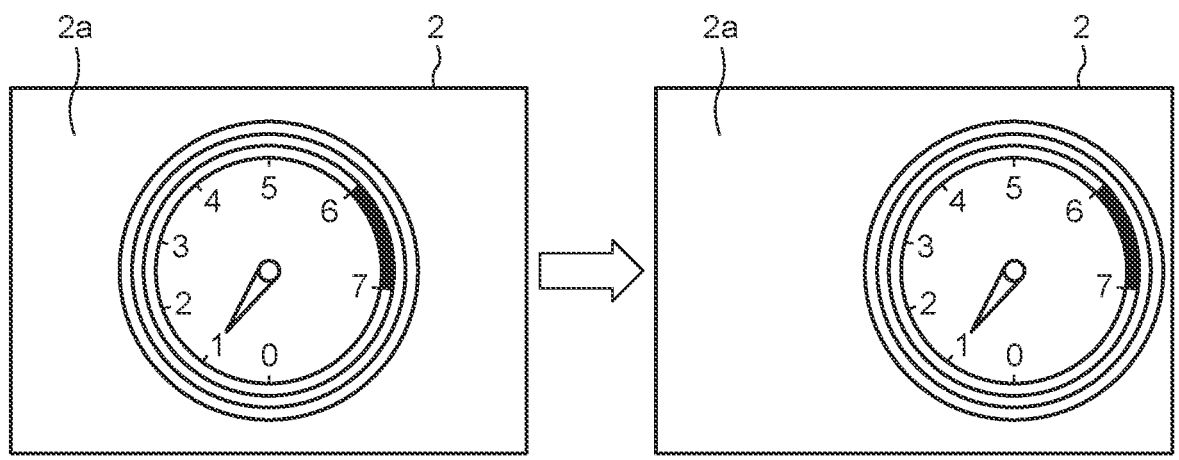
FIG. 2 is a schematic diagram explaining how an image is moved on the display device according to the embodiment.
Figure 3:
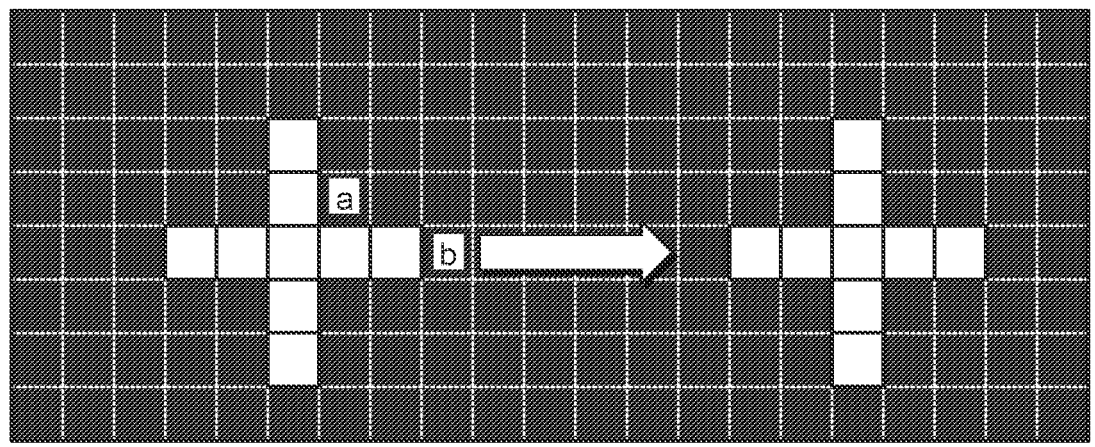
FIG. 3 is a schematic diagram explaining a decrease in luminance of an image from when the image has been stopped that occurs while the image is displayed as being moved.
Figure 4:
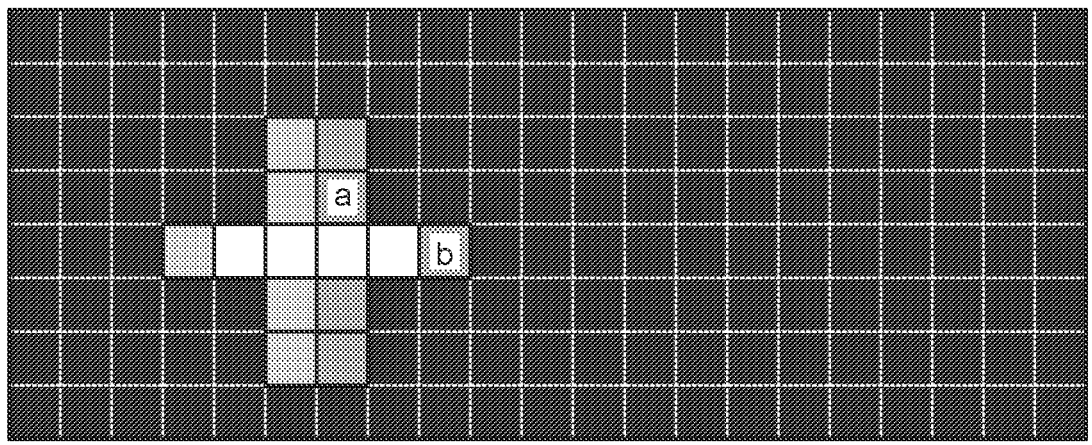
FIG. 4 is a schematic diagram explaining a decrease in luminance of an image from when the image has been stopped that occurs while the image is displayed as being moved.
Figure 5:
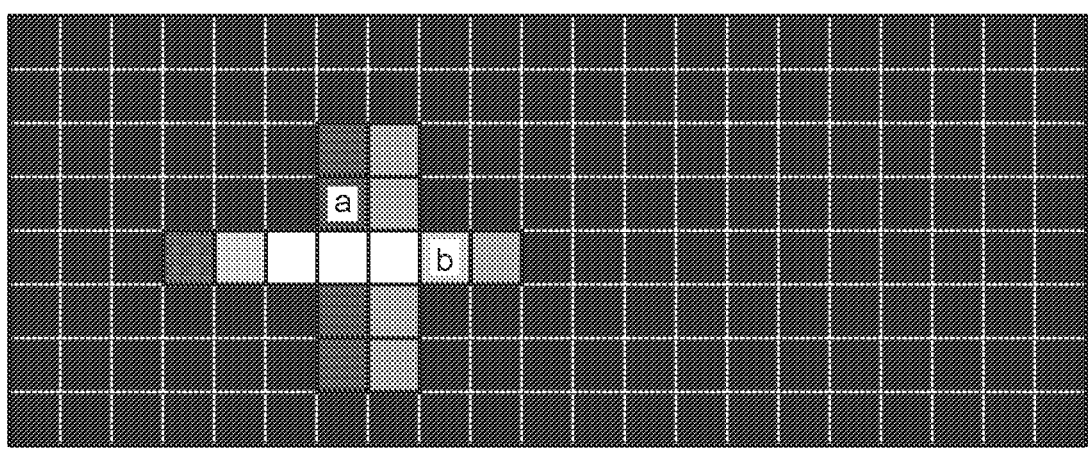
FIG. 5 is a schematic diagram explaining a decrease in luminance of an image from when the image has been stopped that occurs while the image is displayed as being moved.
Figure 6:
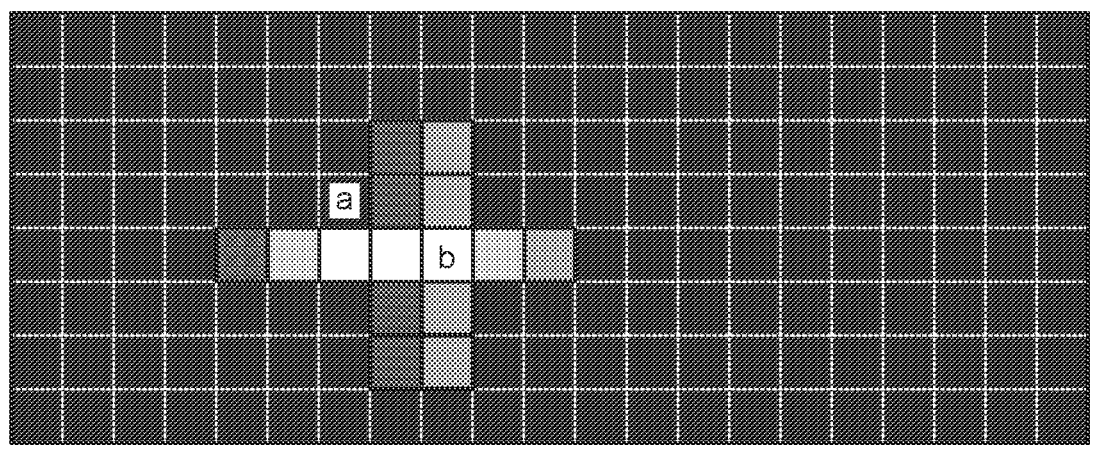
FIG. 6 is a schematic diagram explaining a decrease in luminance of an image from when the image has been stopped that occurs while the image is being displayed as being moved.

For example, as illustrated in FIG. 2, the controller 3 can perform, based on a control command from higher-level equipment such as an ECU, processing of controlling the display unit 2 to display an image (image representing a tachometer in this example) as being moved in a desired direction (to the observers' right in this example), the image having been displayed as being stopped on the image display surface 2a. The controller 3 in this embodiment is configured to control the display unit 2 to execute the moving-manner correction processing when an image having been displayed as being stopped on the image display surface 2a is displayed as being moved. Thus, even when an image that has been displayed as being stopped is displayed as being moved, the image is appropriately displayed with associated visual incongruity suppressed.

Figure 7:
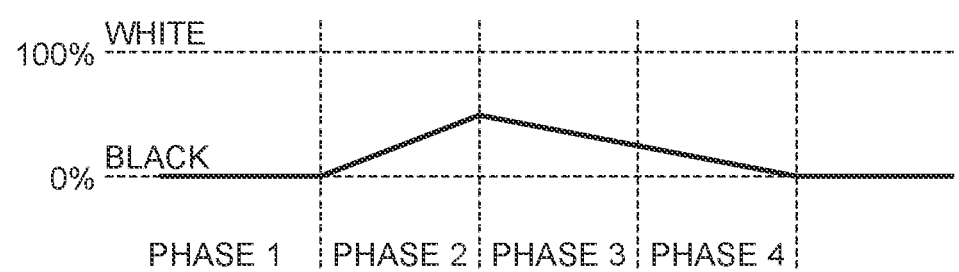
FIG. 7 is a line graph explaining exemplary changes of a color for display in different phases of moving an image.
Figure 8:
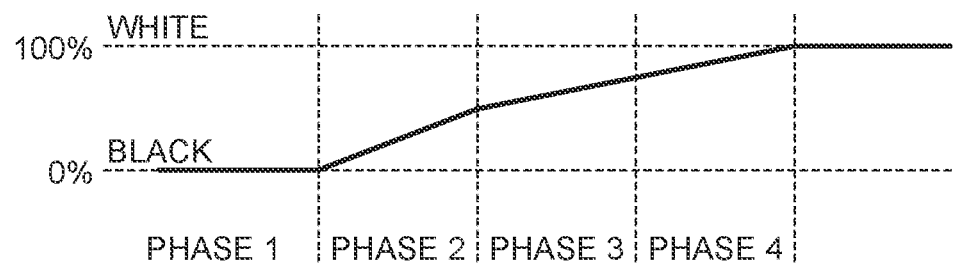
FIG. 8 is a line graph explaining exemplary changes of a display color in different phases of moving an image.

In this connection, for example, unless the moving-manner correction processing is performed when an image having been displayed as being stopped on the image display surface 2a is displayed as being moved in any direction, the display unit 2 may possibly appear as if the luminance of the image that has been stopped decreases while the image is displayed as being moved. A decrease in luminance of an image from when the image has been stopped that occurs while the image is displayed as being moved is explained using, as an example, a case where an image having a white cross-shaped figure is displayed as being moved to the observers' right, for example, as illustrated in FIG. 3 to FIG. 6. FIG. 7 and FIG. 8 represent examples of changes in display color during different phases of moving an image. In each of these drawings, while the horizontal axis is used as a time axis (phases), the vertical axis is used as an axis indicating changes of a display color. The changes are represented as percentages of a change from the minimum luminance (display in black) to maximum luminance (display in white) (100% corresponds to when the display color has completely turned white). In the display unit 2, a slight time lag (for example, corresponding to a period of several V-Sync intervals) attributable to characteristics, such as the output response speed of pixels, of a liquid crystal display that employs TFTs occurs from when R, G, and B signals corresponding to the designated R, G, and B values are output to the display unit 2 from the controller 3 to when each of the pixels actually turns into a display color determined by the designated R, G, and B values. This time lag tends to vary depending on specifications of the display unit 2 and display colors from and into which the pixel turns. Additionally, in the display unit 2, before the pixel completes thus turning from one display color into another, if the pixel turns from one display color into the next, the pixel may possibly enter, momentarily, a state of being in a display color different from an eventual display color desired in accordance with designated R, G, and B values. As a result of such a phenomenon, for example, if each of the pixels forming the image to be moved is changed in display color "from white into black" or "from black into white" while the image is moved, the image to be displayed as being moved on the display unit 2 may possibly enters a period where the pixel appears "gray" until the pixel is completely changed, that is, a period where apparent luminance of the pixel appears to have decreased. For example, when the image in a state illustrated in FIG. 3 during the phase 1 moves rightward stepwise to a state illustrated in FIG. 4 during the phase 2, to a state illustrated in FIG. 5 during the phase 3, and then to a state illustrated in FIG. 6 during the phase 4, a pixel a illustrated in FIG. 3 turns gray in the course of turning white from black as illustrated in FIG. 7, and then starts turning back black before completely turning white. Thus, the pixel a turns black before completely turning white, thereby seemingly suffering a decrease in apparent luminance. In contrast, when the image in a state illustrated in FIG. 3 during the phase 1 moves rightward stepwise to a state illustrated in FIG. 4 during the phase 2, to a state illustrated in FIG. 5 during the phase 3, and then to a state illustrated in FIG. 6 during the phase 4, a pixel b illustrated in FIG. 3 turns gray in the course of turning white from black as illustrated in FIG. 8. The pixel b stably continues turning white during the phases 2 and 3 although having not yet completed turning white from black, and completes turning white at the end of the phase 4, because the eventual display color thereof is white. Thus, decreases in luminance of an image from when the image has been stopped that occur while the image is displayed as being moved may possibly occur, to a greater or lesser extent, in regions of the image that have relatively short lengths in the direction of moving the image and in regions of the image that have relatively long lengths in the direction of moving the image.

To eliminate this inconvenience, the controller 3 in this embodiment executes, when an image that has been displayed as being stopped on the image display surface 2a is displayed as being moved, the moving-manner correction processing in which the R, G, and B values of pixels are adjusted based on previously determined RGB correction values. Thus, a decrease in luminance of an image from when the image has been stopped that occurs while the image is being displayed as being moved is suppressed, so that visual incongruity is suppressed.

Specifically, the controller 3 can control the display unit 2 to execute the moving-manner correction processing when the image is displayed as being moved. The moving-manner correction processing is processing by which pixels forming the image to be moved are displayed in display colors determined by corrected R, G, and B values obtained by adding RGB correction values to color component values provided as R, G, and B values that indicate respective display colors of corresponding pixels forming the image while the image has been stopped. More specifically, the moving-manner correction processing is processing by which a decrease in luminance of an image from when the image has been stopped that occurs while the image is displayed as being moved is suppressed because pixels forming the image being displayed as being moved are displayed in display colors determined by the corrected R, G, and B values. The RGB correction values applied to this moving-manner correction processing are values each previously determined in common for the color component values of a corresponding display color among display colors that pixels forming an image to be moved are assumed to be able to have. The controller 3, in one example, functionally conceptually includes a storage unit 31, a correction unit 32, and a display controller 33 as illustrated in FIG. 1. The storage unit 31, the correction unit 32, and the display controller 33 are capable of exchanging various kinds of information with various apparatuses that are electrically coupled to these units.

The storage unit 31 is a storage device such as a memory and has conditions and data that are needed for various kinds of processing to be performed by the controller 3, and various computer programs that are executed by the controller 3, stored therein. The storage unit 31 also has image data (including R, G, and B values that respective pixels have while an image is being stopped) stored therein that represents images to be displayed by the display unit 2. The storage unit 31 in this embodiment also stored therein, previously, RGB correction values that are used in the moving-manner correction processing. Each of the RGB correction values has been previously determined in common for the color components of a corresponding display color among display colors that pixels forming an image to be displayed on the image display surface 2a are assumed to be able to have. Typically, the RGB correction values are set to values that result in suppression of a decrease in luminance of an image from when the image has been stopped that occurs while the image is displayed as being moved. For example, given that, as described above, a decrease in luminance of an image to be moved depends on the length of the image in the direction of moving the image, the RGB correction values may be set so as to be larger when corresponding to a display color of a pixel in a region of the image that is relatively short in the direction of moving the image and to be smaller when corresponding to a display color of a pixel in a region of the image that is relatively long in the direction of moving the image. RGB correction values may be set as appropriate so as to correspond to, for example, display colors of pixels included in an image to be moved and display colors of pixels included in a background image of the image to be moved, in other words, display colors from and into which the pixels turn. In this embodiment, with consideration given to differences in luminance of the image between when the image is being stopped and when the image is displayed as being moved, differences in decrease in luminance depending on lengths of the image in the direction of moving the image, display colors of pixels included in an image to be moved, display colors of pixels included in a background image of the image to be moved, display colors from and into which pixels turn, and the like, the RGB correction values may be previously determined through actual observation with human eyes in actual equipment evaluation so that a congruous image can be obtained, or may be previously determined through actual measurement of luminance using a luminance meter or the like.

The correction unit 32 is a unit configured to calculate corrected R, G, and B values. The correction unit 32 calculates corrected R, G, and B values by adding RGB correction values stored in the storage unit 31 to respective color component values, that is, R, G, and B values that indicate respective display colors of corresponding pixels forming an image while the image has been stopped, the image being to be moved. Based on R, G, and B values and RGB correction values stored in the storage unit 31, the correction unit 32 calculates the corrected R, G, and B values, the R, G, and B values indicating respective display colors of the pixels forming the image while the image has been stopped. The correction unit 32 may temporarily store the calculated corrected R, G, and B values in the storage unit 31.

The display controller 33 is a unit configured to control the display unit 2 to control images to be displayed by the display unit 2. Based on the corrected R, G, and B values calculated by the correction unit 32, the display controller 33 in this embodiment controls the display unit 2 to execute the moving-manner correction processing. That is, the display controller 33 displays pixels in display colors determined by the corrected R, G, and B values calculated by the correction unit 32, the pixels forming the image to be moved.

Figure 9:
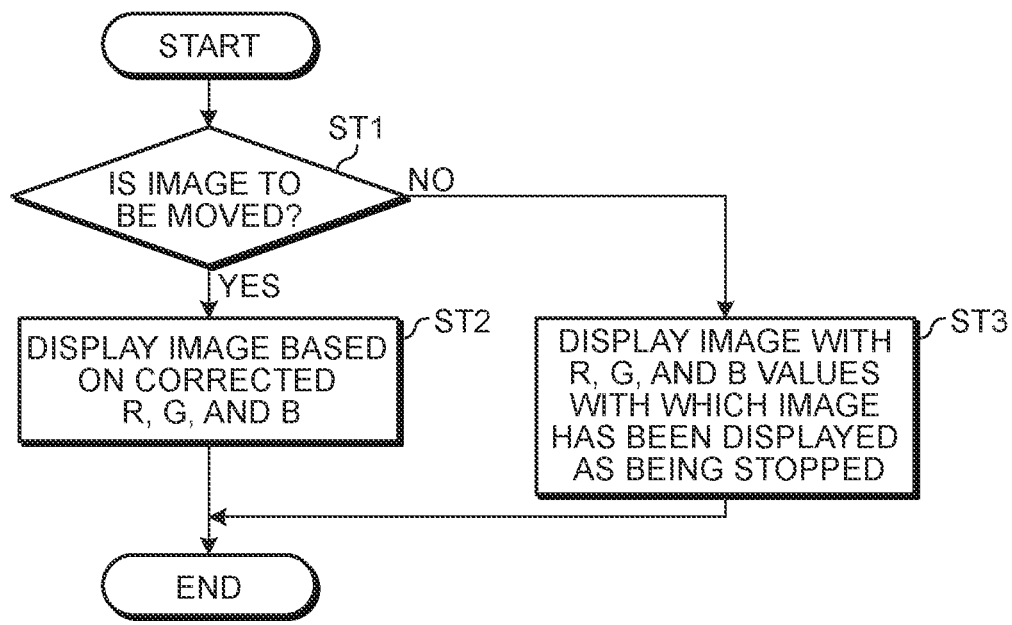
FIG. 9 is a flowchart illustrating exemplary display control to be performed by the display device according to the embodiment.

An example of display control to be performed by the controller 3 on the display unit 2 is described next with reference to the flowchart in FIG. 9. Each of these control routines is repeatedly executed in control cycles (clock units) of several to several ten milliseconds.

First, the display controller 33 of the controller 3 determines whether an image that has been displayed as being stopped on the display unit 2 is to be moved (Step ST1). The display controller 33 determines, for example, based on a control command from higher-rank equipment such as the ECU, whether the image is to be moved.

If it is determined that the image that has been displayed as being stopped on the display unit 2 is to be moved (Yes at Step ST1), the display controller 33 controls the display unit 2 to execute the moving-manner correction processing, based on the corrected R, G, and B values calculated by the correction unit 32, and displays the image (Step ST2), thus ending the current control cycle and proceeding to the next control cycle. In this case, based on R, G, and B values and RGB correction values stored in the storage unit 31, the correction unit 32 of the controller 3 calculates the corrected R, G, and B values, the R, G, and B values indicating respective display colors of pixels forming the image while the image has been stopped. The display controller 33 then display pixels in display colors determined by the corrected R, G, and B values calculated by the correction unit 32, the pixels forming the image to be moved.

If it is determined that the image that has been displayed as being stopped on the display unit 2 is not to be moved (No at Step ST1), that is, if it is determined that the image is to be held stopped, the display controller 33 displays the image based on the R, G, and B values stored in the storage unit 31 that indicate respective display colors of pixels forming the image while the image has been stopped (Step ST3), thus ending the current control cycle and proceeding to the next control cycle.

In the display device 1 described above, when an image displayed on the display unit 2 is displayed as being moved, the controller 3 controls the display unit 2 to execute moving-manner correction processing, so that pixels forming the image to be moved in display are displayed in display colors determined by corrected R, G, and B values obtained by adding RGB correction values to color component values provided as R, G, and B values that indicate respective display colors of corresponding pixels forming the image while the image has been stopped. Each of the RGB correction values is applied in common for the color component values of a corresponding display color. Thus, when an image that has been displayed as being stopped is moved, the display device 1 can, without changing apparent colors of respective display colors of corresponding pixels forming the image to be moved, relatively brighten the pixels. Therefore, when an image that has been displayed as being stopped is displayed as being moved, the display device can suppress a decrease in apparent luminance of the image. As a result, even when an image that has been displayed as being stopped is displayed as being moved, the display device 1 can suppress a decrease in apparent luminance of the image and thereby can appropriately display the image by suppressing associated incongruity.

More particularly, because the RGB correction values are set to values that result in suppression of a decrease in luminance of an image from when the image has been stopped that occurs while the image is displayed as being moved, the display device 1 described above can suppress a decrease in apparent luminance of a image to be moved as described above and can appropriately display the image.

With RGB correction values set so as to be larger when corresponding to a display color of a pixel in a region of the image that has a relatively short length in the direction of moving the image and so as to be smaller when corresponding to a display color of a pixel in a region of the image that has a relatively long length in the direction of moving the image, the display device 1 can more appropriately suppress a decrease in apparent luminance of the image by reflecting differences in decrease in luminance depending on lengths of the image in the direction of moving the image. Thus, the display device 1 can prevent unevenness in apparent luminance from occurring depending on regions of the image.

The above-described display devices according to the embodiments of the present invention are not limited by the above-described embodiments, and can be variously changed within the scope of the appended claims.

The display device 1 described above is, for example, applied to a vehicle and included as a component of an in-vehicle meter installed in the vehicle. The display device 1 may be applied to a navigation system and included as a component of the navigation system, or may be applied to equipment other than vehicles.

The controller 3 described above has been described as, but is not limited to, a unit in which: the storage unit 31 stores therein RGB correction values; the correction unit 32 calculates corrected R, G, and B values based on the RGB correction values stored in the storage unit 31; and the display controller 33 controls the display unit 2 to execute the moving-manner correction processing, based on the corrected R, G, and B values calculated by the correction unit 32. The controller 3 may be configured as a unit in which: the storage unit 31 stores therein corrected R, G, and B values previously calculated based on the RGB correction values; and the display controller 33 controls the display unit 2 to execute the moving-manner correction processing, based on the corrected R, G, and B values previously stored in the storage unit 31.

In the display device according to the embodiment, when an image displayed on the display unit is displayed as being moved, the controller controls the display unit to execute moving-manner correction processing, so that pixels forming the image to be moved are displayed in display colors determined by corrected R, G, and B values obtained by adding RGB correction values to color component values provided as R, G, and B values that indicate respective display colors of corresponding pixels forming the image while the image has been stopped. Thus, when an image that has been displayed as being stopped is moved, the display device can relatively brighten pixels without changing base colors of respective display colors thereof, the pixels forming the image to be moved. Therefore, when an image that has been displayed as being stopped is displayed as being moved, the display device can suppress a decrease in apparent luminance of the image. As a result, even when an image that has been displayed as being stopped is displayed as being moved, the display device can suppress a decrease in apparent luminance of the image, thereby being effective at enabling the image to be appropriately displayed by suppressing associated incongruity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising: a display that displays an image including an object; and a controller configured to: set color component values of respective display colors of corresponding pixels forming the image to first component values, while the displayed object is not moving, wherein the color component values are provided as R, G, and B values that indicate red, green, and blue color components, respectively; and execute, when the displayed object is displayed as moving, moving-manner correction processing by which the color component values of respective display colors of destination pixels for newly displaying the object are set to second component values, wherein the second component values are component values obtained by adding RGB correction values to the first component values, wherein the first color component values are different from the second color component values when representing the same display color, wherein in each pixel, the RGB correction values have been previously determined in common for the color component values of a corresponding display color, and the RGB correction values are set so as to be larger when corresponding to a display color of a pixel in a region of the displayed object that is relatively short in the direction of moving the displayed object and to be smaller when corresponding to a display color of a pixel in a region of the displayed object that is relatively long in the direction of the moving the displayed object.

2. The display device according to claim 1, wherein the moving-manner correction processing is performed such that the destination pixels are displayed in display colors determined by the second component values, and a decrease in a luminance of the display object from when the image is not moving that occurs while the displayed object is displayed as being moved is therefore suppressed, and the RGB correction values are set to values that result in suppression of the decrease in the luminance of the displayed object that occurs, from when the image is not moving, while the image is displayed as being moved.

3. The display device according to claim 1, wherein the RGB correction values are set to values that result in suppression of a decrease in luminance of the display object that occurs, from when the displayed object is not moving, while the displayed object is displayed as being moved.

4. A display device comprising: a display that displays an image; and a controller configured to, when the image is displayed as being moved, control the display to execute moving-manner correction processing by which pixels forming the image to be moved are displayed in display colors determined by corrected R, G, and B values obtained by adding RGB correction values to color component values provided as R, G, and B values that indicate red, green, and blue color components of respective display colors of corresponding pixels forming the image while the image has been stopped, the RGB correction values each having been previously determined in common for the color component values of a corresponding display color, wherein the RGB correction values are set so as to be larger when corresponding to a display color of a pixel in a region of the image that is relatively short in the direction of moving the image and to be smaller when corresponding to a display color of a pixel in a region of the image that is relatively long in the direction of moving the image.

* * * * *